3,461,203
METHOD FOR PREVENTING PUERPERAL
PARESIS
Nils E. Ringarp, Tvaaker, Sweden, assignor to Aktiebolaget Leo (A/B Leo), Halsingborg, Sweden
No Drawing. Filed Dec. 28, 1964, Ser. No. 421,625
Int. Cl. A61k 27/00
U.S. Cl. 424—153                              9 Claims

ABSTRACT OF THE DISCLOSURE

Method for the prophylactic treatment of animals against parturient paresis comprising orally administering to said animals an effective quantity of a composition comprising an aqueous solution of calcium chloride in a non-toxic physiologically acceptable gel carrier having a viscosity of at least 100 centipoises in a plurality of doses, each daily dose comprising at least about 25 grams of calcium chloride, given within a period beginning approximately two weeks before parturition and ending approximately seven days after parturition, the majority of said total dosage being given before parturition.

---

The present invention relates to a mineral composition having prophylactic properties against parturient paresis in animals, particularly cows, and to a method for the treatment of parturient paresis involving employment of the said novel mineral composition.

Parturient paresis (also known as puerperal paresis and milk fever) is a common disease in animals, especially in cows, and occurs as an undesirable complication in a great many deliveries. The usual symptoms appear just after parturition and comprise coma or somnolence and paresis. The disease is connected with subnormal calcium values of the blood. Intravenous injections of calcium are even presently commonly employed for curative therapy, only because of the lack of a better approach to the problem, but in numerous cases the cows do not recover completely. Many of them have difficulties in, or remain incapable of, rising and remain "downers." Some of those animals suffer degeneration of skeletal muscles and myocardium, which further damage can cause the death of the animal or make slaughter necessary. In other words, parturient paresis has become one of the most common animal diseases and each year causes the animal husbandry heavy economic losses. Thus, it is quite natural that an effective prophylactic treatment has often been sought. This desire is further accentuated by the fact that cows which have once suffered from parturient paresis, to a very large extent, reacquire it once again at the time of subsequent parturitions. Many attempts have accordingly been made in an effort to prevent parturient paresis. Such attempts have been made with peroral as well as with parenteral administration of vitamin D. [J. W. Hibbs, & W. D. Pounden: J. Dairy Sci., 38, 65 (1955); J. C. Dell, & B. R. Poulton: J. Dairy Sci., 41, 1706 (1958)]. Further prophylactic treatment has been attempted by maintaining a low Ca/P (calcium of phosphorus) ratio in the feed in order to stimulate the parathyroid glands [F. Ender, et al.: Acta Vet. Scand., 3, Suppl. 1 (1962)]. Peroral administration of a calcium lactate-aluminum hydroxide-compound during the last week before parturition has also been suggested. [G. M. Ward, & C. Vair: J. Am. Vet. Med. Ass., 154, 520 (1959)]. Parenteral administrations of ACTH and corticosteroids [K. Jonsgard: Nord. Vet. Med., 15, 28 (1963)] or progesterone just before delivery [E. Gerola: Gazz. vet. Milano, cit: Vet. Bull., 33, 396 (1963)] are representative of still other attempts to prevent parturient paresis. None of the foregoing treatments has, however, been effective and without harmful side-effects and, until the time of the present invention, there simply has not been any effective, reliable, safe, and practical method for the prevention of parturient paresis.

It is of course known, as previously suggested, that animals, for example cows, absorb calcium from the alimentary canal and that certain amounts of labile bone calcium are also available internal of the animal, these sources together making up a source of interstitial calcium, which in turn provides a source of serum calcium. On the other hand, calcium is excreted daily in the form of endogenous fecal calcium, urinary calcium, and in lactating animals also in the form of milk calcium. The amount of calcium excreted daily in the form of milk calcium during lactation may in some cases equal or even exceed the daily amount absorbed from the alimentary canal, but usually does not [E. W. Moodie: Vet. Rec., 72, 1145 (1960)]. If the animal, e.g., cow, continued to absorb calcium from the alimentary canal at a normal rate during parturition and lactation, the problem presented would not be particularly serious. However, although the reason is not understood, at parturition the animal dose not appear to be able to absorb calcium at the same rate, perhaps due to inactivation of some mechanism necessary for absorption of calcium at or about parturition. Moreover, this decreased absorption rate is not offset by a counterbalancing spontaneous or conscious increase in food intake on the part of the animal before, during, or after parturition and/or lactation.

Special attempts have therefore been made, as might be supposed, to supply calcium to make up for this deficiency or inactivation at parturition, but without success. Limited attempts have, for example, been made to employ a calcium chloride solution for peroral alministration in curative treatment of existing paresis by means of a stomach tube [Dr. E. Glawischnig: Arbeitsheft, Internationale Tagung über Rinderkrankheiten, Wien 17.–19. Mai, 1962]. Such method is inconvenient and no one will employ it since the stomach tube must be eliminated for practical considerations. However, it has also appeared that peroral administration of a calcium chloride solution by means of a bottle or otherwise than by means of a stomach tube has been so dangerous that it has been considered impractical and contraindicated. The animals, e.g., cows, try to avoid oral intake of the solution due to its extremely salty taste and cases of aspiration pneumonia have occurred from such attempted oral treatment, even with mortal results.

The use of injected calcium for the prevention of parturient paresis has been suggested [J. R. Grieg: Vet. Rec., 10, 301 (1930)]. Greig recommends two injections with a 24-hour interval. Such method has, however, proved to be ineffective and unsuitable for use in veterinary practice, for which reason it has been completely abandoned. So far as is known, no attempts have been made to administer calcium chloride solutions orally as a prophylaxis against parturient paresis, much less in the form of the compositions of the present invention which employ a physiologically acceptable gel carrier.

It is, therefore, an object of the present invention to provide a novel and generally practicable method for the prophylactic treatment of parturient paresis in animals, particularly cows, and a novel mineral composition which is suitable for the prevention of parturient paresis in animals, particularly cows, and adapted for use in the said novel method of treatment. Other objects of the invention will become apparent hereinafter and still others will be apparent to one skilled in the art.

The novel composition of the present invention is a mineral composition, having prophylatic properties against parturient paresis in animals, in dosage form, comprising:

(a) As active ingredient an effective amount of calcium chloride in the form of an aqueous solution thereof, and (b) A non-toxic physiologically acceptable gel carrier therefor, The amount of said calcium chloride in said composition ordinarily being between about 25 and about 250 grams and the viscosity of said composition being at least 100 centipoises. The viscosity of the composition is preferably between 100 and about 10,000 centipoises, especially between about 1,000 and 5,000 centipoises, and the amount of the calcium chloride in said composition is preferably between about 75 and 125 grams. The concentration of the calcium chloride solution is usually about 5 to about 50 percent weight per volume, preferably about 20 to about 40 percent weight per volume. The mineral composition advantageously contains an effective amount of a ruminatoric agent in addition to the calcium chloride, among which veratrum alkaloids deserve special mention.

The novel method of the present invention is a method for the prophylactic treatment of animals, particularly cows, against parturient paresis which comprises orally administering an effective quantity of a composition comprising an aqueous solution of calcium chloride in a non-toxic physiologically acceptable gel carrier therefor having a viscosity of at least 100 centipoises in a plurality of doses given within a period beginning approximately two weeks before parturition and ending approximately seven days after parturition, the majority of said total dosage being given before parturition. Preferably the composition is administered within the period beginning approximately five days before and ending approximately two days after parturition, each daily dose usually comprises at least about 25, especially between about 50 and 250 grams of calcium chloride, and the viscosity of the composition is usually preferably between 100 and about 10,000 centipoises, preferably between about 1,000 and 5,000 centipoises. The daily doses preferably comprise about 75 to about 125 grams of calcium chloride, and the weight per volume concentration of the calcium chloride solution is usually about 5 to about 50 percent, ordinally 20 to about 40 percent. An effective quantity of a ruminatoric agent is advantageously administered concurrently with the calcium chloride composition, and again veratrum alkaloids deserve special mention.

The gel carrier employed in the invention may be any suitable physiologically acceptable carrier which allows attainment of the necessary or desired viscosity levels. Illustratively, ethoxyethylcellulose, hydroxymethylcellulose, sodium carboxymethylcellulose, and agar-agar may be employed, the first two and especially the first one being preferred, although numerous others may be employed.

Inasmuch as the preparation according to the invention is given the consistency of a gel, many of the above-mentioned disadvantages of previous approaches to the problem are avoided. With the addition of the gel-forming substance, the strong saline taste of the calcium chloride is also diminished and a well adjusted viscosity eliminates the risk of aspiration pneumonia. It is therefore in most instances preferred to keep the viscosity between about 1,000 and 5,000 centipoises. At a lower viscosity, the risk of aspiration increases whereas, as higher viscosities the gel is frequently too thick for convenient administration in a simple and readily practicable manner. The administration is preferably carried out by means of a plastic "squeeze" bottle and, if the gel is too thick, there will be a problem in maintaining a correct and chosen dosage. Economically, there will frequently be excessive waste due to residual calcium chloride gel left in the bottle and discarded.

More than 3,000 administrations of calcium chloride gel according to the present invention have been carried out to about 250 cows without any sign of aspiration being observed. At the lower viscosities, aspiration problems such as coughing were more generally observable and more care must accordingly be taken.

The calcium chloride gel composition of the invention may also comprise a suitable taste-correcting substance, e.g., fodder molasses, saccharin sodium, or the like. It is sometimes further advantageous to add one or more trace elements, such as Zn, Co, or Mn, especially considering that a high calcium supply can possibly interfere with the available trace elements, which are necessary for metabolism of the sow. The administration of the calcium chloride gel according to the present invention can also be combined with or given concurrently with the administration of other substances, such as vitamin D and ruminatoric substances, such as veratrum alkaloids, antimony potassium tartrate (tartar emetic), or the like.

The following examples are given by way of illustration.

REPRESENTATIVE GEL PRODUCTION—
GENERAL PROCEDURE

Calcium chloride and zinc chloride (in Example 3 together with cobalt chloride and manganese chloride) are dissolved in some water. The solution is then cooled and the ethoxyethylcellulose or other gel former is added and dispersed at a temperature of +30° C. (maximum). Finally, the remaining water is added. Other equivalent procedure is known in the art and may also be employed with equal facility. Other representative gel-forming agents which may be used are agar-agar, hydroxymethylcellulose, and sodium carboxylmethylcellulose, to name a few.

Example 1.—Gel I

| | | |
|---|---|---|
| Calcium chloride, anhydrous | grams | 232 |
| Zinc chloride | do | 2.5 |
| Ethoxyethylcellulose | do | 9 |
| Fodder molasses | do | 50 |
| Water q.s. ad vol | milliliters | 450 |

The final gel had a viscosity of about 1,600 centipoises. The composition is prepared by the "General Procedure."

Example 2.—Gel II

| | | |
|---|---|---|
| Calcium Chloride, anhydrous | grams | 115 |
| Zinc chloride | do | 2.5 |
| Ethoxyethylcellulose | do | 10 |
| Water q.s. ad vol. | milliliters | 400 |

The composition is prepared according to the "General Procedure." It had a viscosity of about 2,400 centipoises.

Example 3.—Gel III

| | | |
|---|---|---|
| Calcium chloride, anhydrous | grams | 100 |
| Zinc chloride | do | 2.5 |
| Cobalt chloride | do | 0.5 |
| Manganese chloride | do | 0.3 |
| Ethoxyethylcellulose | do | 10 |
| Water q.s. ad vol. | milliliters | 400 |

The composition is prepared according to the "General Procedure" given. It had a viscosity of about 2,400 centipoises.

The following examples and tables illustrate the results obtained by clinical trials with calcium chloride gel compositions according to the present invention. Dairy cows with a previous history of parturient paresis and a paresis at the last parturition were selected for the trials.

Example 4.—Prescription

Experimental Group I.—250 milliliters of Gel I once daily during 3 days; then 250 milliliters twice daily 2 days before and 1 day after parturition.

Experimental Group II.—250 milliliters of Gel II twice daily during 4–5 days preceding parturition. In addition 5 million I.U. of vitamin $D_2$ are given perorally during 3-4 days before expected parturition. Some diarrhea and loss of appetite was observed at these doses.

TABLE 1

| Group No. | Treatment | No. cows | No. cases of parturient paresis | |
|---|---|---|---|---|
| | | | Cases | Percent |
| Exp. Gr. I | Gel I | 37 | 4 | 10.8 |
| Exp. Gr. II | Gel II and vitamin D₂ | 28 | 3 | 10.7 |
| Control Gr | | 17 | 8 | [1] 47.0 |

[1] Ca 4.7x.

Example 5.—Prescription

Experimental Group I.—250 milliliters of Gel I once daily during 7-8 days before and 2 days after parturition. In close connection to parturition an additional 250 milliliters dose is given. The interval between two administrations should not be short of 2-3 hours.

Experimental Group II.—Gel II is administered under the same conditions as for experimental Group I above.

TABLE 2

| Group No. | Treatment | No. cows | No. cases of parturient paresis | |
|---|---|---|---|---|
| | | | Cases | Percen n |
| Exp. Gr. I | Gel I | 67 | 5 | 7.5 |
| Exp. Gr. II | Gel II | 64 | 5 | 7.8 |
| Control Gr | | 73 | 40 | [1] 54.8 |

[1] Ca 7x.

Example 6.—Prescription 250 milliliters of Gel III is given once daily during 7-8 days before and 2 days after parturition. In close connection to parturition an additional 250 milliliters dose is given. In addition, 8-10 milliliters Tinctura Veratri NB is administered perorally twice daily during the same period, either concurrently with the Gel III or embodied into combination therewith.

TABLE 3

| Group No. | Treatment | No. cows | No. cases of parturient paresis | |
|---|---|---|---|---|
| | | | Cases | Percent |
| Exp. Gr | Gel III, Tinctura Veratri. | 24 | 1 | 4.2 |
| Control Gr | | 24 | 9 | [1] 37.5 |

[1] Ca 9x.

Example 7

A further specific example of another composition which has been found suitable is as follows:

Calcium chloride, anhydrous _____ grams____ 187
Hydroxymethylcellulose _____ do____ 15.8
Saccharin sodium _____ do____ 2.6
Fodder molasses _____ do____ 26
Water q.s. to make total of _____ milliliters__ 500

The saccharin sodium is dissolved in the water. The calcium chloride and the fodder molasses are dissolved by stirring, whereupon the hydroxymethylcellulose is added by means of a high-speed mixer rotating at about 4000 r.p.m.

SUMMARIZATIONS

TABLE 4.—NUMBER OF THERAPEUTIC TREATMENTS OF PARTURIENT PARESIS IN EXPERIMENTAL AND CONTROL GROUPS (EXAMPLES 4-6)

| Group | No. cows | No. cases of parturient paresis | | No. slaughtered cows |
|---|---|---|---|---|
| | | Cases | Percent | |
| Exp. Gr | 220 | 18 | 8.2 | |
| Control Gr | 114 | 57 | 50.0 | [1] 3 |

[1] Ca 6x.

TABLE 5.—LENGTH OF TREATMENT AND NUMBER OF PARTURIENT PARESIS IN EXAMPLES 4-6

[Recommended treatment: 7-8 days before and 2 days after parturition]

| Length of treatment before parturition, days | No. treated cows | No. parturient paresis cases |
|---|---|---|
| 2 | 8 | 2 |
| 3 | 13 | 1 |
| 4 | 7 | |
| 5 | 13 | 2 |
| 6 | 24 | 3 |
| 7 | 28 | 1 |
| 8 | 21 | 1 |
| 9 | 13 | |
| 10 | 11 | 1 |
| 11-22 | 17 | |
| Total | 155 | 11 |
| Mean | 7.2% | 7.9% |

NOTE.—[Statistical Quadrant Sum Test of Association [Olmstead, P. and Tukey: Ann. Math. Statistics 18, 495-513 (1947)] did not reveal any association between length of treatment and number of parturient paresis cases.]

In Example 6 (Table 3) the calcium chloride gel dose was combined with an oral dosage of Tinctura Veratri in order to prevent a reduction in rumination and impaired activity of the forestomach.

Examples 4-6 have shown that peroral dosage of calcium chloride gel prior to parturition according to the invention reduces the incidence of parturition paresis in the entire group tested from 50% in the central group to 8.2% in the experimental groups. The cause of the attained effect is likely the fact that the peroral administration of calcium chloride gel guarantees a permanent and good resorption of calcium during the treatment period. Furthermore the calcium chloride is acidifying in itself on account of which it counteracts alkalosis and causes increased concentration of Ca-ions in blood and tissues.

Treatment with calcium chloride gel compositions according to the invention is readily carried out and does not involve a great deal of time for the treatment. A certain difficulty with prophylactic treatment of this kind, where the animal is to be treated during a certain period before parturition, e.g., calving, is to determine the exact day of parturition. Some variation in the duration of treatment will thus in some cases be inescapable. The method of the present invention does not, however, cause any inconveniences if the duration of the treatment must be extended to three weeks or even more owing to difficulties to determining the exact date of parturition. On the other hand several trials have shown that a treatment duration of 1-2 days is too short to obtain best prophylactic effect. From a practical-empirical standpoint, a treatment duration of 5-6 days before and 2 days after parturition has been shown to be most convenient.

It is to be understood that the invention is not to be limited to the exact procedure, details of operation or exact compounds, compositions, or materials shown and described, as obvious modifications and equivalents will be apparent to one skilled in the art.

I claim:

1. A method for the prophylactic treatment of animals against parturient paresis which comprises orally administering to said animals an effective quantity of a composition comprising an aqueous solution of calcium chloride in a non-toxic physiologically acceptable gel carrier therefor having a viscosity of at least 100 centipoises in a plurality of doses, each daily does comprising at least about 25 grams of calcium chloride, given within a period beginning approximately two weeks before parturition and ending approximately seven days after parturition, the majority of said total dosage being given before parturition.

2. A method according to claim 1, wherein the composition is administered within the period beginning 5-6 days before and ending approximately 1-2 days after parturition.

3. A method according to claim 1, wherein each daily dose comprises between about 25 and 250 grams of calcium chloride.

4. A method according to claim 1, wherein the viscosity of the composition is between 100 and about 10,000 centipoises.

5. A method according to claim 1 wherein the viscosity of the composition is between about 1,000 and 5,000 centipoises and wherein the daily dose comprises about 75 to about 125 grams of calcium chloride.

6. A method according to claim 1 wherein the gel carrier comprises ethoxyethylcellulose.

7. A method according to claim 1, wherein the viscosity of the composition is between about 1,000 and 5,000 centipoises.

8. A method according to claim 7 wherein the weight per volume concentration of the calcium chloride solution is about 5 to about 50 percent.

9. A method according to claim 7 wherein the weight per volume concentration of the calcium chloride solution is about 20 to about 40 percent.

References Cited

Chemical Abstracts, vol. 48, 1954, p. 7782.
Chemical Abstracts, vol. 51, 1957, p. 12381.
Chemical Abstracts, vol. 51, 1957, p. 806.
Chemical Abstracts, vol. 51, 1957, pp. 6144–6145.
Chemical Abstracts, vol. 43, 1949, p. 8793.
Chemical Abstracts, vol. 49, 1955, p. 14373.
Chemical Abstracts, vol. 49, 1955, p. 1322.
Chemical Abstracts, vol. 35, 1941, p. 1987.
Chemical Abstracts, vol. 46, 1952, p. 4349.
Chemical Abstracts, vol. 33, 1939, p. 3879.
Chemical Abstracts, vol. 28, 1934, p. 2594.
Chemical Abstracts, vol. 17, 1923, p. 2757.
Chemical Abstracts, vol. 49, 1955, pp. 6466–6467.
Chemical Abstracts, vol. 45, 1951, p. 10337.
Chemical Abstracts, vol. 48, 1954, p. 12313.
Farmers Bulletin No. 206, U.S. Dept. of Agriculture, 1904, pp. 1–9.

FRANK CACCIAPAGLIA, JR., Primary Examiner